US011567227B2

(12) United States Patent
Wang et al.

(10) Patent No.: US 11,567,227 B2
(45) Date of Patent: Jan. 31, 2023

(54) MULTI-MODE DISPERSION ENERGY IMAGING DEVICE AND METHOD FOR A FOUR-COMPONENT MARINE INTERFACE WAVE OF AN OCEAN BOTTOM SEISMOMETER

(71) Applicant: Institute of Geology and Geophysics, Chinese Academy of Sciences, Beijing (CN)

(72) Inventors: Yuan Wang, Beijing (CN); Qingyu You, Beijing (CN); Tianyao Hao, Beijing (CN); Yaoxing Hu, Beijing (CN); Chunlei Zhao, Beijing (CN); Yan Zhang, Beijing (CN); Xiqiang Xu, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 239 days.

(21) Appl. No.: 17/138,940

(22) Filed: Dec. 31, 2020

(65) Prior Publication Data

US 2022/0113442 A1    Apr. 14, 2022

(30) Foreign Application Priority Data

Oct. 14, 2020 (CN) .................... CN202011094047.0

(51) Int. Cl.
*G01V 1/38* (2006.01)

(52) U.S. Cl.
CPC .......... *G01V 1/3852* (2013.01); *G01V 1/3808* (2013.01); *G01V 2210/1427* (2013.01)

(58) Field of Classification Search
CPC ............... G01V 1/3852; G01V 1/164; G01V 2210/1427
See application file for complete search history.

(56) References Cited

U.S. PATENT DOCUMENTS

| 2013/0028050 | A1* | 1/2013 | Ozdemir | .............. | G01V 1/3808 |
| | | | | | 367/24 |
| 2015/0308864 | A1* | 10/2015 | Paulsson | ............... | G01V 1/48 |
| | | | | | 73/152.16 |

FOREIGN PATENT DOCUMENTS

| CN | 107024714 A | * | 8/2017 | ............. | G01V 1/137 |
| CN | 110879410 A | * | 3/2020 | | |
| WO | WO-2017062322 A1 | * | 4/2017 | ............. | G01V 1/282 |

OTHER PUBLICATIONS

Klein et al., "Acquisition and Inversion of Dispersive Seismic Waves in Shallow Marine Evironments", Marine Geophysical Researches (2005) 26:287-315 (Year: 2005).*

(Continued)

*Primary Examiner* — Yuqing Xiao
*Assistant Examiner* — Christopher Richard Walker
(74) *Attorney, Agent, or Firm* — Bayramoglu Law Offices LLC

(57) ABSTRACT

The present invention provides a multi-mode dispersion energy imaging device and method for a four-component marine interface wave of an ocean bottom seismometer, belonging to the technical field of marine seismic exploration. The method includes the following steps: designing an marine interface wave artificial seismic observation system, designing a reasonable observation system according to the geological condition of the operation area to ensure the resolution of the imaging to perform the marine artificial source seismic operation carrying out the data preprocessing of the seafloor surface wave, and then carrying out the three-component seismometer Scholte wave and the acoustic guided wave dispersion energy imaging, and the one-component hydrophone acoustic guided wave dispersion energy imaging; superposing and normalizing the three-component Scholte wave dispersion energy spectrum and the one-component acoustic guided wave dispersion energy (Continued)

spectrum. The device is implemented based on the method above.

10 Claims, 2 Drawing Sheets

(56) References Cited

OTHER PUBLICATIONS

Shen et al., "Resolution Equivalence of Dispersion-Imaging Methods for Noise-Free High-Frequency Surface-Wave Data", Journal of Applied Geophysics 122 (2015) 167-171 (Year: 2015).*
Boiero et al., "Surface and Guided Wave Inversion for Near-Surface Modeling in Land and Shallow Marine Seismic Data", The Leading Edge, vol. 32, Issue 6 (2013) (Year: 2013).*
CN-110879410-A (Machine Translation) (Year: 2020).*
CN-107024714-A (Machine Translation) (Year: 2017).*

* cited by examiner

MULTI-MODE DISPERSION ENERGY IMAGING DEVICE AND METHOD FOR A FOUR-COMPONENT MARINE INTERFACE WAVE OF AN OCEAN BOTTOM SEISMOMETER

CROSS-REFERENCE TO RELATED APPLICATIONS

This application is based upon and claims priority to Chinese Patent Application No. 202011094047.0, filed on Oct. 14, 2020, the entire contents of which are incorporated herein by reference.

TECHNICAL FIELD

The present invention relates to the technical field of marine seismic exploration, in particular to a multi-mode dispersion energy imaging device and method for a four-component marine interface wave of an ocean bottom seismometer, which is mainly applied to marine geological engineering surveys, as well as marine geophysical surveys.

BACKGROUND

Due to the fact that the shear wave velocity of the ocean shallow sedimentary strata is directly related to the shear modulus, the shear modulus is frequently used as an indirect evaluation indicator for detection of a soft medium, a fracture and a water-containing karst cave in the seabed sedimentary strata. The shear modulus is widely applied to marine engineering constructions such as offshore oil platforms, offshore wind farms, submarine pipelines and undersea tunnels. In the inshore areas of China, most of the shallow sedimentary strata contain soft siltstones, and the corresponding shear wave velocity is down to 80 m/s, so it is difficult to acquire the converted-wave data of high signal-to-noise ratio by means of the traditional shear wave analysis method. Moreover, the marine interface wave has a characteristic of frequency dispersion, the transverse propagation attenuation is relatively slow, and the dispersion curve has the highest sensitivity to the shear wave velocity parameter. Therefore, the marine interface wave dispersion analysis method and technology have become the most widely and reliably used in the sea floor shear wave detection.

The interface waves on the seafloor include the Scholte wave with a frequency between 1-20 Hz, named after the foreign scholar Scholte who first proved its existence (Scholte, 1947) and the acoustic guided wave with a frequency between 5-150 Hz (Glangeaud et al., 1999; Klein et al., 2005). The main difference between the Scholte wave and the acoustic guided wave is that the Scholte wave propagates along the interface between the seawater and the seabed, while the acoustic guided wave propagates through multiple reflections on the sea surface and the seabed. Such a difference makes the velocities of the two waves quite different. The Scholte wave is generally related to the shear wave velocity at the shallow area, and the velocity of the Scholte wave is 0.95 times the shear wave velocity, so that the velocity is lower. However, the acoustic guided wave velocity is between the compressional wave (P wave) in the seawater and the compressional wave velocity in the shallow sedimentary strata, and thus, the acoustic guided wave velocity is much higher than the Scholte wave.

Currently, the prior art uses only one marine interface wave to perform dispersion energy imaging, and there is no precedent for the joint imaging of the two different types of marine interface waves. In the Scholte wave dispersion energy imaging, the prior art typically uses the vertical Scholte wave rather than using the three-component Scholte waves for analysis. In the acoustic guided wave dispersion energy imaging, only the hydrophone component is used. In fact, three-component high-frequency seismometers also record acoustic guided waves. Therefore, two types of marine interface waves are combined in the dispersion energy imaging technology, which will greatly promote the development of the marine interface wave detection technology.

SUMMARY

The purpose of the present invention is to provide a multi-mode dispersion energy imaging method for a four-component marine interface wave of an ocean bottom seismometer, so as to solve the problem of extracting multi-mode dispersion curves in the marine interface wave detection. The method includes acquiring four-component marine interface wave data, preprocessing four-component artificial source gather data, imaging three-component Scholte wave dispersion energy, superposing one-component acoustic guided wave dispersion energy imaging and four-component dispersion energy spectrum, which realizes the joint dispersion energy imaging of the Scholte wave and the acoustic guided four-component marine interface wave and will greatly increase the mode of the marine interface wave dispersion curves, especially for more high-mode marine interface wave dispersion curves. High-mode surface wave dispersion curves will provide more constraints for the subsequent shear wave velocity inversion, particularly increasing the depth and the resolution of the inversion model.

Specifically, a multi-mode dispersion energy imaging method for a four-component marine interface wave of an ocean bottom seismometer includes the following steps:

step 101: designing an marine interface wave artificial seismic observation system, which includes an ocean bottom seismometer deployment point and an artificial seismic source excitation point; carrying out marine seismic data acquisition according to the designed marine interface wave artificial seismic observation system, which includes ocean bottom seismometer deployment, air gun firing, ocean bottom seismometer retrieval, and ocean bottom seismometer original data retrieval;

step 102: using excitation time and position navigation information of an air gun excitation seismic source to acquire a common receiving point gather excited by an air gun from an original continuous data sequence recorded by an ocean bottom seismometer while carrying out cross-section position correction and clock offset correction, performing trace equalization and band-pass filtering, exporting a result and saving the result into SU or SEGY format;

step 103: reading data of the common receiving point gather of the air gun excitation seismic source from a three-component seismometer, and performing attitude correction on the three-component seismometer to obtain three-component seismometer gather data in a shot line direction, a direction perpendicular to a shot line, and a vertical direction; and performing dispersion energy imaging of a Scholte wave in the shot line direction and the vertical direction respectively using a phase shifting method to obtain a shot line dispersion energy spectrum and a vertical dispersion energy spectrum, respectively, of the Scholte wave;

step 104: reading the data of the common receiving point of the air gun excitation seismic source from a hydrophone component, and using the phase shifting method to analyze the dispersion energy of the marine acoustic guided wave of the hydrophone component to obtain the dispersion energy spectrum of the acoustic guided wave of the hydrophone component;

step 105: superposing the shot line dispersion energy spectrum of the Scholte wave, the vertical dispersion energy spectrum of the Scholte wave and the dispersion energy spectrum of the acoustic guided wave, and carrying out normalization processing on the superposed marine interface wave dispersion energy spectrum to obtain a final marine interface wave dispersion energy map.

Furthermore, the present invention provides a multi-mode dispersion energy imaging device for a four-component marine interface wave of an ocean bottom seismometer for realizing the method, including:

an ocean bottom seismometer raw data reading module configured for reading raw data in a binary format recorded by the ocean bottom seismometer;

an marine interface wave data preprocessing module configured for converting the raw data format, extracting the common receiving point gather, and performing attitude correction, clock offset correction, trace equalization and band-pass filtering;

an marine interface wave phase shifting method analysis module configured for calculating the dispersion energy spectrum of the common receiving point gather;

an marine interface wave dispersion energy superposition module configured for superposing the dispersion energy spectrums of the Scholte wave and the acoustic guided wave, and performing normalization;

an marine interface wave dispersion energy spectrum storage and exporting module configured for storing and exporting the normalized marine interface wave dispersion energy map.

The advantages of the present invention are as follows: the present invention designs a multi-mode dispersion energy imaging device and method for a four-component marine interface wave of an ocean bottom seismometer to solve the problem of extracting high-mode marine interface wave dispersion curves when the velocity of the shear wave is slow in the shallow sedimentary strata. In the method, a three-component seismometer Scholte wave dispersion energy spectrum and a one-component hydrophone acoustic guided wave dispersion energy spectrum are superposed to obtain multi-mode marine interface wave dispersion curves. In particular, the dispersion energy spectrum superposition and analysis technology is built in its entirety, and specific technical requirements and details are set forth in the aspects of four-component marine interface wave instrument and equipment, offshore operation system designing, and data post-processing.

DETAILED DESCRIPTION OF THE EMBODIMENTS

Figure 1:
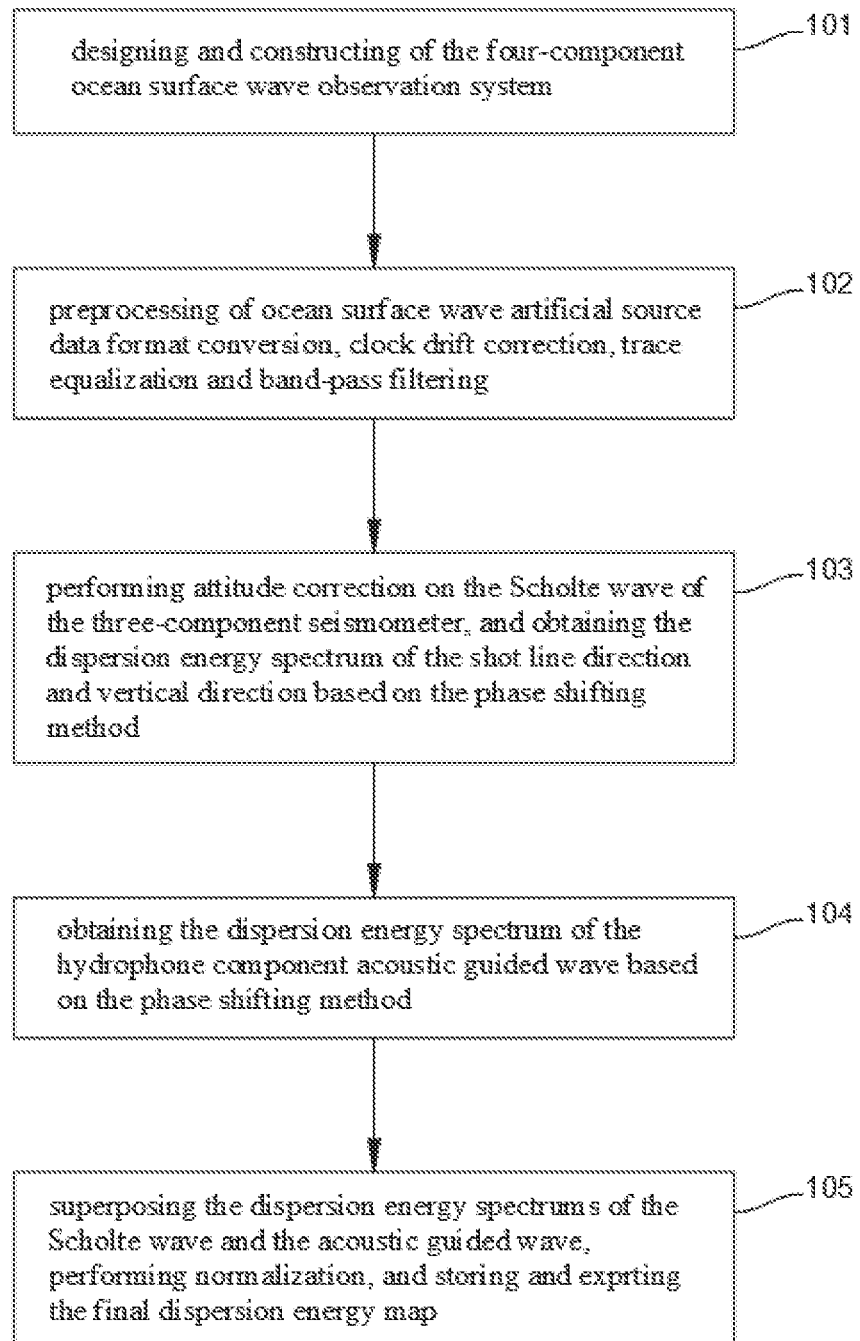
FIG. 1 is a flowchart of the method of the present invention.

The specific embodiments of the present invention will be described below with reference to the drawings:

As shown in FIG. 1, the present invention provides a multi-mode dispersion energy imaging method for a four-component marine interface wave of an ocean bottom seismometer, including the following steps:

step 101: designing an marine interface wave artificial seismic observation system, which includes an ocean bottom seismometer deployment point and an artificial seismic source excitation point; carrying out marine seismic data acquisition according to the designed marine interface wave artificial seismic observation system, which includes ocean bottom seismometer deployment, air gun firing, ocean bottom seismometer retrieval, and ocean bottom seismometer original data retrieval;

step 102: using the excitation time and position navigation information of the artificial seismic source to acquire a common receiving point gather excited by an air gun from an original continuous data sequence recorded by an ocean bottom seismometer while carrying out cross-section position correction and clock offset correction, performing trace equalization and band-pass filtering, exporting a result and saving the result into SU or SEGY format;

step 103: reading the data of the common receiving point gather of the artificial seismic source from a three-component seismometer, and performing attitude correction on the three-component seismometer to obtain three-component seismometer gather data in a shot line direction, a direction perpendicular to a shot line, and a vertical direction; and performing dispersion energy imaging of the Scholte wave in the shot line direction and the vertical direction respectively using a phase shifting method to obtain a shot line dispersion energy spectrum and a vertical dispersion energy spectrum, respectively, of the Scholte wave;

step 104: reading the data of the common receiving point of the artificial seismic source from a hydrophone component, and using the phase shifting method to analyze the dispersion energy of the marine acoustic guided wave of the hydrophone component to obtain the dispersion energy spectrum of the acoustic guided wave of the hydrophone component;

step 105: superposing the shot line dispersion energy spectrum of the Scholte wave, the vertical dispersion energy spectrum of the Scholte wave and the dispersion energy spectrum of the acoustic guided wave, and carrying out normalization processing on the superposed marine interface wave dispersion energy spectrum to obtain a final marine interface wave dispersion energy map.

In the above step 101, the ocean bottom seismometer for ocean bottom seismic observation and marine interface waves collection has the specification parameter requirements as follows: (1) a four-component data acquisition system, including a three-component seismometer and a one-component hydrophone; (2) the three-component seismometer is a broadband seismometer, having the minimum frequency band range of 1-250 Hz; (3) a frequency band range of an acoustic hydrophone capable of recording low-frequency acoustic signals is 5-500 Hz; (4) a data sampling rate meets 500 SPS, preferably 1000 SPS. As for the requirement for an air gun excitation seismic source, the total capacity of the air gun must meet the requirement of 3000 $inch^3$, and an excitation sub-wave band range width is greater than 60 Hz, wherein, the high frequency is not higher than 120 Hz, and the low frequency is not lower than 5 Hz.

In the above step 101, the observation system is designed to have a water depth of no more than 100 m. The maximum offset distance excited by the air gun excitation seismic source is no less than 2500 m because the large offset distance increases the resolution of dispersion energy imaging. The submerged depth of the air gun is greater than 5 m, and it is recommended that the submerged depth of the air gun should be greater than 10 m in areas with greater water depth. An excitation point distance $\Delta_x$ of the air gun needs to satisfy the following formula:

$$\Delta_x \le \frac{V_{ag}}{f_{max}},$$

wherein $V_{ag}$ is the minimum phase velocity of the marine interface wave of the detection area, and $f_{max}$ is the maximum observable frequency of the marine interface wave. In the operation process, the ocean bottom seismometer is deployed first, and after the ocean bottom seismometer sinks freely to the ocean bottom, the air gun seismic source excitation operation is performed, and finally, the ocean bottom seismometer retrieval is carried out.

In the above step 103, the attitude correction of the three-component seismometer includes: correcting a roll angle and a pitch angle to ensure that the vertical component is perpendicular to the normal direction of the sea surface; and correcting an azimuth angle, so that the X component points to the positive direction of the shot line and the Y component is perpendicular to the positive direction of the shot line. The method for correcting the pitch angle and roll angle is as follows:

$$V_{xyv} = R_\theta R_\phi V_{xyz},$$

wherein $V_{xyv}$ is a three-component seismic data column vector after the pitch angle and roll angle are corrected to a horizontal attitude, $V_{xyz}$ is an original three-component seismic data column vector, and $R_\theta$ and $R_\phi$ are the rotation matrices of the pitch angle and the roll angle respectively, and the expressions thereof are as follows:

$$R_\theta = \begin{bmatrix} \cos\theta & 0 & -\sin\theta \\ 0 & 1 & 0 \\ \sin\theta & 0 & \cos\theta \end{bmatrix},$$

$$R_\phi = \begin{bmatrix} 1 & 0 & 0 \\ 0 & \cos\phi & -\sin\phi \\ 0 & \sin\phi & \cos\phi \end{bmatrix},$$

wherein $\theta$ is the pitch angle, and $\varphi$ is the roll angle.

A correction method for the azimuth angle is:

$$V_{rtv} = R_\gamma V_{xyv},$$

wherein $V_{rtv}$ is the column vector after the azimuth angle is corrected, and $R_\gamma$ is the azimuth rotation matrix as follows $$R_\gamma = \begin{bmatrix} \cos\gamma & \sin\gamma & 0 \\ -\sin\gamma & \cos\gamma & 0 \\ 0 & 0 & 1 \end{bmatrix},$$

wherein $\gamma$ is the azimuth angle obtained by direct wave polarization analysis.

In the above steps 103 and 104, the method of calculating the dispersion energy spectrum of the marine interface wave by using the phase shifting method includes:

performing the Fourier transform on the common receiving point gather $r_i$ of the vertical component marine interface wave in the time-space domain:

$$R_i(x_k,\omega) = FFT(r_i),$$

wherein i is the serial number of the trace, $x_k$ is the offset distance, and $R_i(x_k,\omega)$ is the frequency spectrum;

then performing the normalization on the amplitude of the frequency spectrum to obtain the normalized frequency spectrum $T_i(x_k,\omega)$:

$$T_i(x_k, \omega) = \frac{R_i(x_k, \omega)}{|R_i(x_k, \omega)|},$$

wherein $|R_i(x_k,\omega)|$ represents a modulo operation;

when the phase velocity $v_s$ and frequency $\omega$ of the marine interface wave are given, acquiring the dispersion energy at the point as:

$$D(v_s, \omega) = \frac{1}{N} \sum_1^N e^{j\left(\frac{x_k \omega}{v_s}\right)} T_i \quad (i = 1, \ldots, N),$$

wherein j is an imaginary unit, selecting a certain phase velocity range and a frequency range of the marine interface wave, and cyclically calculating the dispersion energy corresponding to all points in the range at a specific phase velocity and a frequency interval to obtain the marine interface wave dispersion energy spectrum of the common receive point gather in the time-space domain.

For the four-component Scholte wave and acoustic guided wave dispersion energy spectrum calculation, the phase velocity range is preferably 100 m/s-1800 m/s, the phase velocity interval is preferably 1 m/s, and the frequency range is preferably 0.8-150 Hz.

In the above step 105, the superposition and normalization processing is performed on the Scholte wave dispersion energy $D_r(v_s,\omega)$ in the shot line direction, the Scholte wave dispersion energy $D_z(v_s,\omega)$ in the vertical direction, and the acoustic guided wave dispersion energy $D_d(v_s,\omega)$ of the hydrophone by using the following equation:

$$D_s(v_s,\omega) = \frac{1}{3}\{D_r(v_s,\omega) + D_z(v_s,\omega) + D_d(v_s,\omega)\},$$

wherein $D_s(v_s,\omega)$ is the marine interface wave energy after being superposed and normalized.

Based on the same inventive concept, the present invention also provides a multi-mode dispersion energy imaging device for a four-component marine interface wave of an ocean bottom seismometer.

Figure 2:
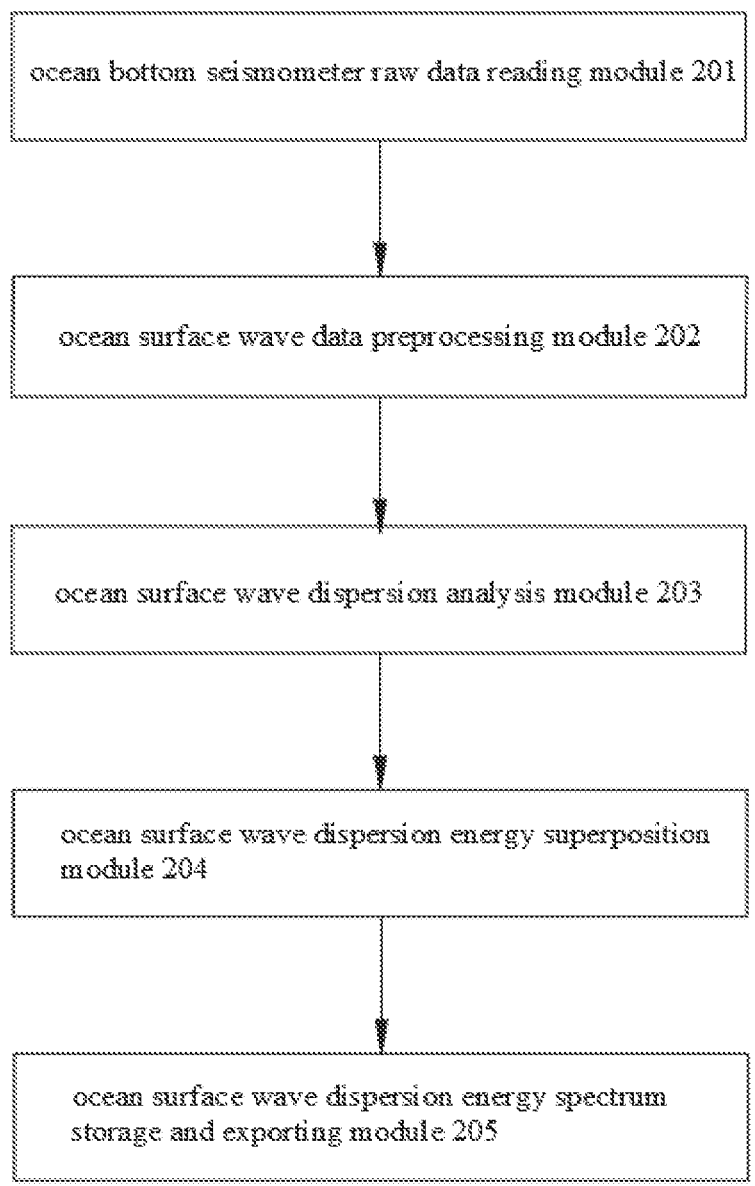
FIG. 2 is a structural block diagram of the device of the present invention.

FIG. 2 is a block diagram of a multi-mode dispersion energy imaging device for a four-component marine interface wave of an ocean bottom seismometer of the present invention, including the ocean bottom seismometer raw data reading module 201, the marine interface wave data preprocessing module 202, the marine interface wave phase shifting method analysis module 203, the marine interface wave dispersion energy superposition module 204, and the marine interface wave dispersion energy spectrum storage and exporting module 205. The structure of the device is illustrated as follows.

The ocean bottom seismometer raw data reading module 201 is configured for reading the raw artificial source seismic data recorded by the ocean bottom seismometer.

The marine interface wave data preprocessing module 202 is configured for converting the raw data format, extracting the common receiving point gather, and performing position correction, clock offset correction, trace equalization, band-pass filtering and attitude correction.

The marine interface wave phase shift method analysis module 203 is configured for calculating the dispersion energy spectrum of the common receiving point gather.

The marine interface wave dispersion energy superposition module 204 is configured for superposing the Scholte wave and the acoustic guided wave dispersion energy spectrum, and performing normalization.

The marine interface wave dispersion energy spectrum storage and exporting module 205 is configured for storing and exporting the normalized marine interface wave dispersion spectrum.

In the above module 202, for a attitude correction of the three-component seismometer, the correction includes: correcting the roll angle and the pitch angle are corrected to ensure that the vertical component is perpendicular to the normal direction of the sea surface; and correcting the azimuth angle so that the X component points to the positive direction of the shot line and the Y component is perpendicular to the positive direction of the shot line.

The method for correcting the pitch angle and the roll angle is as follows:

$$V_{xyv}=R_\theta R_\phi V_{xyz},$$

wherein $V_{xyv}$ is the three-component seismic data column vector after the pitch angle and the roll angle are corrected to the horizontal attitude, $V_{xyz}$ is the original three-component seismic data column vector, and $R_\theta$ and $R_\phi$ are the rotation matrices of the pitch angle and the roll angle respectively, and the expressions thereof are as follows:

$$R_\theta = \begin{bmatrix} \cos\theta & 0 & -\sin\theta \\ 0 & 1 & 0 \\ \sin\theta & 0 & \cos\theta \end{bmatrix},$$

$$R_\phi = \begin{bmatrix} 1 & 0 & 0 \\ 0 & \cos\phi & -\sin\phi \\ 0 & \sin\phi & \cos\phi \end{bmatrix},$$

wherein $\theta$ is the pitch angle, and $\varphi$ is the roll angle.

A correction method for the azimuth angle is:

$$V_{rtv}=R_\gamma V_{xyv},$$

wherein $V_{rtv}$ is the column vector after the azimuth angle is corrected, and $R_\gamma$ is the azimuth rotation matrix as follows $$R_\gamma = \begin{bmatrix} \cos\gamma & \sin\gamma & 0 \\ -\sin\gamma & \cos\gamma & 0 \\ 0 & 0 & 1 \end{bmatrix},$$

wherein $\gamma$ is the azimuth angle obtained by direct wave polarization analysis.

In the above module 203, the method of calculating the dispersion energy spectrum of the marine interface wave by the phase shifting method includes:

performing Fourier transform on the common receiving point gather r of the vertical component marine interface wave in the time-space domain:

$$R_i(x_k,\omega)=FFT(r_i),$$

wherein i is the serial number of the channel, $x_k$ is the offset distance, and $R_i(x_k,\omega)$ is the frequency spectrum;

then performing the normalization on the amplitude of the frequency spectrum to obtain the normalized frequency spectrum $$T_i(x_k,\omega) = \frac{R_i(x_k,\omega)}{|R_i(x_k,\omega)|},$$

wherein $|R_i(x_k,\omega)|$ represents a modulo operation;

when the phase velocity $v_s$ and frequency $\omega$ of the marine interface wave are given, acquiring the dispersion energy at the point as:

$$D(v_s,\omega) = \frac{1}{N}\sum_1^N e^{j\left(\frac{x_k\omega}{v_s}\right)}T_i \ (i=1,\ldots,N),$$

wherein j is an imaginary unit, selecting a certain phase velocity range and a frequency range of the marine interface wave, and cyclically calculating the dispersion energy corresponding to all points in the range at a specific phase velocity and a frequency interval to obtain the marine interface wave dispersion energy spectrum of the common receive point gather in the time-space domain.

For the four-component Scholte wave and acoustic guided wave dispersion energy spectrum calculation, the phase velocity range is preferably 100 m/s-1800 m/s, the phase velocity interval is preferably 1 m/s, and the frequency range is preferably 0.8-150 Hz.

In the above module 205, superposition and normalization processing is performed on the Scholte wave dispersion energy $D_r(v_s,\omega)$ in the shot line direction, the Scholte wave dispersion energy $D_z(v_s,\omega)$ in the vertical direction, and the acoustic guided wave dispersion energy $D_d(v_s,\omega)$ of the hydrophone by using the following equation:

$$D_s(v_s,\omega)=\tfrac{1}{3}\{D_r(v_s,\omega)+D_z(v_s,\omega)+D_d(v_s,\omega)\},$$

wherein $D_s(v_s,\omega)$ is the marine interface wave energy after being superposed and normalized.

The present invention achieves the following technical effects: an ocean bottom seismometer four-component marine interface wave multi-mode dispersion energy imaging method and device realize data acquisition of the marine interface wave of the artificial source by using artificial seismic source excitation and an ocean bottom seismometer, and further realize multi-mode and multi-type marine interface wave dispersion energy spectrum comprehensive imaging by combining the dispersion energy spectrum imaging of the Scholte wave, the dispersion energy spectrum imaging of the acoustic guided wave, and the superposition of two types of the marine interface waves dispersion energy spectrum. This technical method is a basis for the extraction of high-mode dispersion curves in the marine interface wave analysis. The extreme value positions in the results map of the dispersion energy spectrum of this technology are utilized to extract the multi-mode marine interface wave dispersion curves, which provides more constraints for the inversion analysis on marine interface wave frequency dispersion curves and greatly promotes the development of marine interface wave detection technology.

The above are the preferred embodiments of the present invention. It should be pointed out that without departing from the principles of the present invention, those skilled in the art can make several improvements and modifications, and these improvements and modifications should also fall within the protection scope of the present invention.

What is claimed is:

1. A multi-mode dispersion energy imaging method for a four-component marine interface wave of an ocean bottom seismometer, comprising the following steps:

step 101: designing a marine interface wave artificial seismic observation system, wherein the marine interface wave artificial seismic observation system comprises an ocean bottom seismometer deployment point and an artificial seismic source excitation point; carrying out marine seismic data acquisition according to the marine interface wave artificial seismic observation system, wherein the marine seismic data acquisition comprises ocean bottom seismometer deployment, air gun firing, ocean bottom seismometer retrieval, and ocean bottom seismometer original data retrieval;

step 102: using excitation time and position navigation information of an air gun excitation seismic source to acquire a common receiving point gather excited by an air gun from an original continuous data sequence recorded by the ocean bottom seismometer while carrying out cross-section position correction and clock offset correction, performing trace equalization and band-pass filtering, exporting a result and saving the result into a SU or SEGY format;

step 103: reading data of the common receiving point gather of the air gun excitation seismic source from a three-component seismometer, and performing attitude correction on the three-component seismometer to obtain three-component seismometer gather data in a shot line direction, a direction perpendicular to a shot line, and a vertical direction; and performing dispersion energy imaging of a Scholte wave in the shot line direction and the vertical direction, respectively, using a phase shifting method to obtain a shot line dispersion energy spectrum of the Scholte wave and a vertical dispersion energy spectrum of the Scholte wave;

step 104: reading the data of the common receiving point of the air gun excitation source from a hydrophone component, and using the phase shifting method to analyze dispersion energy of a marine acoustic guided wave of the hydrophone component to obtain a dispersion energy spectrum of the marine acoustic guided wave of the hydrophone component;

step 105: superposing the shot line dispersion energy spectrum of the Scholte wave, the vertical dispersion energy spectrum of the Scholte wave and the dispersion energy spectrum of the marine acoustic guided wave to obtain a superposed marine interface wave dispersion energy spectrum, and carrying out normalization processing on the superposed marine interface wave dispersion energy spectrum to obtain a final marine interface wave dispersion energy map;

wherein, in step 101, the ocean bottom seismometer for ocean bottom seismic observation and marine interface wave collection comprises:

a four-component data acquisition system, wherein the four-component data acquisition system comprises the three-component seismometer and a one-component hydrophone;

the three-component seismometer is a broadband seismometer, having a minimum frequency range of 1-250 Hz;

the one-component hydrophone capable of recording low-frequency acoustic signals is an acoustic hydrophone, having a frequency range of 5-500 Hz;

a data sampling rate is 500 SPS, the air gun excitation seismic source requires a total capacity of 3000 INCH', and an excitation sub-wave band range width is greater than 60 Hz, wherein, a high frequency of the excitation sub-wave band range width is not higher than 120 Hz, and a low frequency of the excitation sub-wave band range width is not lower than 5 Hz.

2. The multi-mode dispersion energy imaging method according to claim 1, wherein, a method of calculating a dispersion energy spectrum of the marine interface wave by the phase shifting method comprises:

performing Fourier transform on the common receiving point gather $r_i$ of a vertical component marine interface wave in a time-space domain:

$$R_i(x_k,\omega)=FFT(r_i),$$

wherein i is a serial number of a trace, $x_k$ is an offset distance, and $R_i(x_k,\omega)$ is a frequency spectrum;

performing normalization on an amplitude of the frequency spectrum to obtain a normalized frequency spectrum $$T_i(x_k, \omega) = \frac{R_i(x_k, \omega)}{|R_i(x_k, \omega)|},$$

wherein $|R_i(x_k,\omega)|$ represents a modulo operation;

when a phase velocity $v_s$ and a frequency co of the marine interface wave are given at a point, acquiring dispersion energy at the point, wherein the dispersion energy is:

$$D(v_s, \omega) = \frac{1}{N}\sum_1^N e^{j\left(\frac{x_k\omega}{v_s}\right)}T_i \quad (i = 1, ..., N),$$

wherein j is an imaginary unit, selecting a phase velocity range and a frequency range of the marine interface wave, and cyclically calculating the dispersion energy corresponding to all points in the phase velocity range and the frequency range at a specific phase velocity and a frequency interval to obtain a marine interface wave dispersion energy spectrum of the common receive point gather in the time-space domain, wherein for a four-component Scholte wave and acoustic guided wave dispersion energy spectrum calculation, the phase velocity range is 100 m/s-1800 m/s, a phase velocity interval is 1 m/s, and the frequency range is 0.8-150 Hz.

3. The multi-mode dispersion energy imaging method according to claim 1, wherein, superposition and normalization processing is performed on Scholte wave dispersion energy $D_r(v_s,\omega)$ in the shot line direction, Scholte wave dispersion energy $D_z(v_s,\omega)$ in the vertical direction, and acoustic guided wave dispersion energy $D_d(v_s,\omega)$ of the hydrophone component by using the following equation:

$$D_s(v_s,\omega)=\frac{1}{3}\{D_r(v_s,\omega)+D_z(v_s,\omega)+D_d(v_s,\omega)\},$$

wherein $D_s(v_s,\omega)$ is marine interface wave energy after being superposed and normalized.

4. A multi-mode dispersion energy imaging device for realizing the multi-mode dispersion energy imaging method according to claim 1, wherein, the multi-mode dispersion energy imaging device comprises:

an ocean bottom seismometer raw data reading module configured for reading raw data in a binary format recorded by the ocean bottom seismometer.

5. The multi-mode dispersion energy imaging device according to claim 4, wherein, in step 101, a water depth of the marine interface wave artificial seismic observation system is no more than 100 m, and a maximum offset distance excited by the air gun excitation seismic source is no less than 2500 m; a submerged depth of the air gun is greater than 5 m, and an excitation point distance $\Delta_x$ of the air gun is:

$$\Delta_x \leq \frac{V_{ag}}{f_{max}},$$

wherein $V_{ag}$ is a minimum phase velocity of a marine interface wave of a detection area, and $f_{max}$ is a maximum observable frequency of the marine interface wave, an operation process of the marine seismic data acquisition comprises: deploying the ocean bottom seismometer, after the ocean bottom seismometer sinks freely to an ocean bottom, performing an air gun seismic source excitation operation, and carrying out the ocean bottom seismometer retrieval.

6. The multi-mode dispersion energy imaging device according to claim 4, wherein, in step 103, the attitude correction of the three-component seismometer comprises:
correcting a roll angle and a pitch angle; and correcting an azimuth angle; a correction method for the pitch angle and the roll angle is as follows:

$$V_{xyv} = R_\theta R_\phi V_{xyz},$$

wherein $V_{xyv}$ is a three-component seismic data column vector after the pitch angle and roll angle are corrected to a horizontal attitude, $V_{xyz}$ is an original three-component seismic data column vector, and $R_\theta$ and $R_\phi$ are rotation matrices of the pitch angle and the roll angle respectively, and expressions of the rotation matrices are:

$$R_\theta = \begin{bmatrix} \cos\theta & 0 & -\sin\theta \\ 0 & 1 & 0 \\ \sin\theta & 0 & \cos\theta \end{bmatrix},$$

$$R_\phi = \begin{bmatrix} 1 & 0 & 0 \\ 0 & \cos\phi & -\sin\phi \\ 0 & \sin\phi & \cos\phi \end{bmatrix},$$

wherein $\theta$ is the pitch angle, and $\phi$ is the roll angle,
a correction method for the azimuth angle is as follows:

$$V_{rtv} = R_\gamma V_{xyv},$$

wherein $V_{rtv}$ is a column vector after the azimuth angle is corrected, and $R_\gamma$ is an azimuth rotation matrix as follows:

$$R_\gamma = \begin{bmatrix} \cos\gamma & \sin\gamma & 0 \\ -\sin\gamma & \cos\gamma & 0 \\ 0 & 0 & 1 \end{bmatrix},$$

wherein $\gamma$ is the azimuth angle obtained by a direct wave polarization analysis.

7. The multi-mode dispersion energy imaging device according to claim 4, wherein, a method of calculating a dispersion energy spectrum of the marine interface wave by the phase shifting method comprises:
performing Fourier transform on the common receiving point gather $r_i$ of a vertical component marine interface wave in a time-space domain:

$$R_i(x_k,\omega) = FFT(r_i),$$

wherein i is a serial number of a trace, $x_k$ is an offset distance, and $R_i(x_k,\omega)$ is a frequency spectrum;
performing normalization on an amplitude of the frequency spectrum to obtain a normalized frequency spectrum $$T_i(x_k,\omega) = \frac{R_i(x_k,\omega)}{|R_i(x_k,\omega)|},$$

wherein $|R_i(x_k,\omega)|$ represents a modulo operation;
when a phase velocity $v_s$ and a frequency $\omega$ of the marine interface wave are given at a point, acquiring dispersion energy at the point, wherein the dispersion energy is:

$$D(v_s,\omega) = \frac{1}{N}\sum_1^N e^{j\left(\frac{x_k \omega}{v_s}\right)} T_i \quad (i = 1, \ldots, N),$$

wherein j is an imaginary unit,
selecting a phase velocity range and a frequency range of the marine interface wave, and cyclically calculating the dispersion energy corresponding to all points in the phase velocity range and the frequency range at a specific phase velocity and a frequency interval to obtain a marine interface wave dispersion energy spectrum of the common receive point gather in the time-space domain, wherein for a four-component Scholte wave and acoustic guided wave dispersion energy spectrum calculation, the phase velocity range is 100 m/s-1800 m/s, a phase velocity interval is 1 m/s, and the frequency range is 0.8-150 Hz.

8. The multi-mode dispersion energy imaging device according to claim 4, wherein, superposition and normalization processing is performed on Scholte wave dispersion energy $D_r(v_s,\omega)$ in the shot line direction, Scholte wave dispersion energy $D_z(v_s,\omega)$ in the vertical direction, and acoustic guided wave dispersion energy $D_d(v_s,\omega)$ of the hydrophone component by using the following equation:

$$D_s(v_s,\omega) = \frac{1}{3}\{D_r(v_s,\omega) + D_z(v_s,\omega) + D_d(v_s,\omega)\},$$

wherein $D_s(v_s,\omega)$ is marine interface wave energy after being superposed and normalized.

9. A multi-mode dispersion energy imaging method for a four-component marine interface wave of an ocean bottom seismometer, comprising the following steps:
step 101: designing a marine interface wave artificial seismic observation system, wherein the marine interface wave artificial seismic observation system comprises an ocean bottom seismometer deployment point and an artificial seismic source excitation point; carrying out marine seismic data acquisition according to the marine interface wave artificial seismic observation system, wherein the marine seismic data acquisition comprises ocean bottom seismometer deployment, air gun firing, ocean bottom seismometer retrieval, and ocean bottom seismometer original data retrieval;

step 102: using excitation time and position navigation information of an air gun excitation seismic source to acquire a common receiving point gather excited by an air gun from an original continuous data sequence recorded by the ocean bottom seismometer while carrying out cross-section position correction and clock offset correction, performing trace equalization and band-pass filtering, exporting a result and saving the result into a SU or SEGY format;

step 103: reading data of the common receiving point gather of the air gun excitation seismic source from a three-component seismometer, and performing attitude correction on the three-component seismometer to obtain three-component seismometer gather data in a shot line direction, a direction perpendicular to a shot line, and a vertical direction; and performing dispersion energy imaging of a Scholte wave in the shot line direction and the vertical direction, respectively, using a phase shifting method to obtain a shot line dispersion energy spectrum of the Scholte wave and a vertical dispersion energy spectrum of the Scholte wave;

step 104: reading the data of the common receiving point of the air gun excitation source from a hydrophone component, and using the phase shifting method to analyze dispersion energy of a marine acoustic guided wave of the hydrophone component to obtain a dispersion energy spectrum of the marine acoustic guided wave of the hydrophone component;

step 105: superposing the shot line dispersion energy spectrum of the Scholte wave, the vertical dispersion energy spectrum of the Scholte wave and the dispersion energy spectrum of the marine acoustic guided wave to obtain a superposed marine interface wave dispersion energy spectrum, and carrying out normalization processing on the superposed marine interface wave dispersion energy spectrum to obtain a final marine interface wave dispersion energy map;

wherein, in step 101, a water depth of the marine interface wave artificial seismic observation system is no more than 100 m, and a maximum offset distance excited by the air gun excitation seismic source is no less than 2500 m; a submerged depth of the air gun is greater than 5 m, and an excitation point distance $\Delta_x$ of the air gun is:

$$\Delta_x \leq \frac{V_{ag}}{f_{max}},$$

wherein $V_{ag}$ is a minimum phase velocity of a marine interface wave of a detection area, and $f_{max}$ is a maximum observable frequency of the marine interface wave, an operation process of the marine seismic data acquisition comprises: deploying the ocean bottom seismometer, after the ocean bottom seismometer sinks freely to an ocean bottom, performing an air gun seismic source excitation operation, and carrying out the ocean bottom seismometer retrieval.

10. A multi-mode dispersion energy imaging method for a four-component marine interface wave of an ocean bottom seismometer, comprising the following steps:

step 101: designing a marine interface wave artificial seismic observation system, wherein the marine interface wave artificial seismic observation system comprises an ocean bottom seismometer deployment point and an artificial seismic source excitation point carrying out marine seismic data acquisition according to the marine interface wave artificial seismic observation system, wherein the marine seismic data acquisition comprises ocean bottom seismometer deployment, air gun firing, ocean bottom seismometer retrieval, and ocean bottom seismometer original data retrieval;

step 102: using excitation time and position navigation information of an air gun excitation seismic source to acquire a common receiving point gather excited by an air gun from an original continuous data sequence recorded by the ocean bottom seismometer while carrying out cross-section position correction and clock offset correction, performing trace equalization and band-pass filtering, exporting a result and saving the result into a SU or SEGY format;

step 103: reading data of the common receiving point gather of the air gun excitation seismic source from a three-component seismometer, and performing attitude correction on the three-component seismometer to obtain three-component seismometer gather data in a shot line direction, a direction perpendicular to a shot line, and a vertical direction; and performing dispersion energy imaging of a Scholte wave in the shot line direction and the vertical direction, respectively, using a phase shifting method to obtain a shot line dispersion energy spectrum of the Scholte wave and a vertical dispersion energy spectrum of the Scholte wave;

step 104: reading the data of the common receiving point of the air gun excitation source from a hydrophone component, and using the phase shifting method to analyze dispersion energy of a marine acoustic guided wave of the hydrophone component to obtain a dispersion energy spectrum of the marine acoustic guided wave of the hydrophone component;

step 105: superposing the shot line dispersion energy spectrum of the Scholte wave, the vertical dispersion energy spectrum of the Scholte wave and the dispersion energy spectrum of the marine acoustic guided wave to obtain a superposed marine interface wave dispersion energy spectrum, and carrying out normalization processing on the superposed marine interface wave dispersion energy spectrum to obtain a final marine interface wave dispersion energy map;

wherein, in step 103, the attitude correction of the three-component seismometer comprises: correcting a roll angle and a pitch angle; and correcting an azimuth angle; a correction method for the pitch angle and the roll angle is as follows:

$$V_{xyv} = R_\theta R_\phi V_{xyz},$$

wherein $V_{xyv}$ is a three-component seismic data column vector after the pitch angle and roll angle are corrected to a horizontal attitude, $V_{xyz}$ is an original three-component seismic data column vector, and $R_\theta$ and $R_\phi$ are rotation matrices of the pitch angle and the roll angle respectively, and expressions of the rotation matrices are:

$$R_\theta = \begin{bmatrix} \cos\theta & 0 & -\sin\theta \\ 0 & 1 & 0 \\ \sin\theta & 0 & \cos\theta \end{bmatrix},$$

$$R_\phi = \begin{bmatrix} 1 & 0 & 0 \\ 0 & \cos\phi & -\sin\phi \\ 0 & \sin\phi & \cos\phi \end{bmatrix},$$

wherein θ is the pitch angle, and φ is the roll angle,
a correction method for the azimuth angle is as follows:

$$V_{rtv} = R_\gamma V_{xyv},$$

wherein $V_{rtv}$ is a column vector after the azimuth angle is corrected, and $R_\gamma$ is an azimuth rotation matrix as follows:

$$R_\gamma = \begin{bmatrix} \cos\gamma & \sin\gamma & 0 \\ -\sin\gamma & \cos\gamma & 0 \\ 0 & 0 & 1 \end{bmatrix},$$

wherein γ is the azimuth angle obtained by a direct wave polarization analysis.

* * * * *